United States Patent
Porter et al.

(10) Patent No.: US 6,782,846 B1
(45) Date of Patent: Aug. 31, 2004

(54) PET GROOMING TOOL AND METHOD FOR REMOVING LOOSE HAIR FROM A FURRY PET

(76) Inventors: Angela L. Porter, 1548 Ivy Chase La., Fenton, MO (US) 63026; David Porter, 1648 Ivy Chase La., Fenton, MO (US) 63026

( * ) Notice: Subject to any disclaimer, the term of this patent is extended or adjusted under 35 U.S.C. 154(b) by 295 days.

(21) Appl. No.: 09/584,053

(22) Filed: May 30, 2000

(51) Int. Cl.$^7$ .......................... A01K 13/00; B26B 19/00
(52) U.S. Cl. .................. 119/625; 119/611; 119/618; 132/213.1; 30/195; 30/34.2; 30/346.56; 30/355
(58) Field of Search ................... 119/628, 608, 119/609, 610, 611, 613, 614, 616, 617, 618, 623, 626, 627, 630, 631, 632, 633; 30/34.2, 526; 132/213, 213.1, 214, 215

(56) References Cited

U.S. PATENT DOCUMENTS

| | | | | |
|---|---|---|---|---|
| 191,608 | A | * 6/1877 | Miller | |
| 441,136 | A | * 11/1890 | Clements | |
| 486,295 | A | * 11/1892 | Pflueger | |
| 665,172 | A | * 1/1901 | Carden | |
| 797,184 | A | * 8/1905 | Deneen | .......................... 30/31 |
| 1,061,014 | A | * 5/1913 | Sawyer | |
| 1,085,063 | A | * 1/1914 | Prouty et al. | |
| 2,068,085 | A | * 1/1937 | Stanley | ..................... 236/44 R |
| D154,784 | S | * 8/1949 | Lazar | |
| 2,961,997 | A | * 11/1960 | Oliver | |
| D208,345 | S | * 8/1967 | Battaglia | |
| 3,536,080 | A | * 10/1970 | Player | ..................... 132/213.1 |
| 3,893,424 | A | * 7/1975 | Casler | ......................... 119/618 |
| 3,897,629 | A | * 8/1975 | Liedtke | .......................... 30/30 |
| 3,981,275 | A | 9/1976 | Schimoler | |
| D244,712 | S | 6/1977 | Houston | |
| 4,357,043 | A | * 11/1982 | Towsend | ....................... 15/111 |
| 4,663,841 | A | * 5/1987 | Custer | .......................... 30/30 |
| 4,683,657 | A | * 8/1987 | Anderson et al. | ............ 15/93.1 |
| 4,709,475 | A | * 12/1987 | Phung | ....................... 132/76.2 |
| 4,928,716 | A | * 5/1990 | Greene | ....................... 132/212 |
| 4,970,990 | A | * 11/1990 | Wilhelmi | |
| 5,022,350 | A | * 6/1991 | Sequist | |
| 5,211,131 | A | 5/1993 | Plyler | |
| 5,213,116 | A | * 5/1993 | Stein | .......................... 132/200 |
| 5,449,007 | A | * 9/1995 | Arnhols | ...................... 132/136 |
| 5,704,376 | A | * 1/1998 | Ogunro | ...................... 132/139 |

FOREIGN PATENT DOCUMENTS

DE         3844276 A1 * 12/1988

* cited by examiner

Primary Examiner—Yvonne Abbott
(74) Attorney, Agent, or Firm—Thompson Coburn LLP

(57) ABSTRACT

A pet grooming tool, for use with a furry pet such as a dog or cat having loose hair and non-loose hair, is adapted for removing the loose hair from the pet. The grooming tool comprises an elongate handle portion extending generally along a handle axis, and a pet engageable portion secured to the handle portion. The pet engageable portion includes a blade portion and a plurality of teeth. The blade portion includes a blade edge. The teeth extend from the blade edge. The pet engageable portion is secured to the handle portion in a manner so that pulling the handle portion generally along the handle axis while the pet engageable portion is in engagement with the pet causes the blade portion to engage the loose hair of the pet and pull it from the pet without cutting or pulling the non-loose hair from the pet.

16 Claims, 2 Drawing Sheets

PET GROOMING TOOL AND METHOD FOR REMOVING LOOSE HAIR FROM A FURRY PET

BACKGROUND OF THE INVENTION

This invention relates to pet grooming tools and methods for removing loose hair from a furry pet such as a dog or cat, such as loose hair from the pet's undercoat.

Many pets, such as dogs and cats, tend to molt or shed hair. Pet owners generally want to remove the shed hair from their pets to minimize the amount of hair the pets shed indoors and to improve their pets' appearance. The most common grooming tools used for removing shed hair include brushes and combs. Removing shed hair from a pet by brushing and/or combing a pet's fur is a tedious and time consuming project, because the brush or comb tends to miss most of the shed hair.

Some pet groomers have determined that a toothed blade removed from electric grooming sheers is effective for removing shed hair from a dog or cat. The toothed blade includes a relatively sharp blade edge with a plurality of relatively short, comb-like teeth extending from the edge. Although effective in removing shed hair, the size and shape of the toothed blade makes it difficult to hold while combing or passing the blade over the pet's fur. This difficulty fatigues a groomer's hands and arms, thereby limiting the time a groomer can groom pets in this manner.

SUMMARY OF THE INVENTION

Among the several objects and features of the present invention may be noted: the provision of an improved pet grooming tool for removing shed hair from a pet; the provision of an improved for removing shed hair from a pet; the provision of such a tool and method which removes shed hair quickly and effectively; the provision of such grooming tool and method which minimizes fatigue to a pet groomer using the tool or method to remove shed hair method from a pet.

Generally, a pet grooming tool of the present invention is for use with a furry pet such as a dog or cat having loose hair and non-loose hair. The pet grooming tool is adapted for removing the loose hair from the pet. The grooming tool comprises an elongate handle portion extending generally along a handle axis, and a pet engageable portion secured to the handle portion. The pet engageable portion includes a blade portion and a plurality of teeth. The blade portion includes a blade edge. The teeth extend from the blade edge. The pet engageable portion is secured to the handle portion in a manner so that pulling the handle portion generally along the handle axis while the pet engageable portion is in engagement with the pet causes the blade portion to engage the loose hair of the pet and pull it from the pet without cutting or pulling the non-loose hair from the pet.

Another aspect of the present invention is a method of removing loose hair from a furry pet such as a dog or cat having loose hair and non-loose hair. The method comprises providing a grooming tool having an elongate handle portion extending generally along a handle axis, and a pet engageable portion secured to the handle portion. The pet engageable portion includes a blade portion and a plurality of teeth. The blade portion includes a blade edge. The teeth extend from the blade edge. The method further comprises placing the pet engageable portion in engagement with the pet, and pulling the handle portion generally along the handle axis while maintaining engagement of the pet engageable portion with the pet to cause the blade portion to engage the loose hair of the pet and pull it from the pet without cutting or pulling the non-loose hair from the pet.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
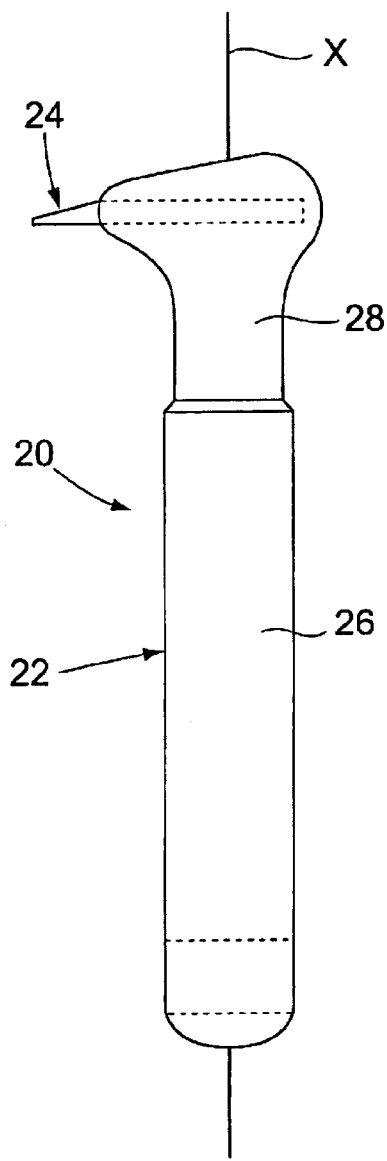
FIG. 1 is a side elevational view of a grooming tool of the present invention, the grooming tool having a handle portion and a pet engageable portion.
Figure 2:
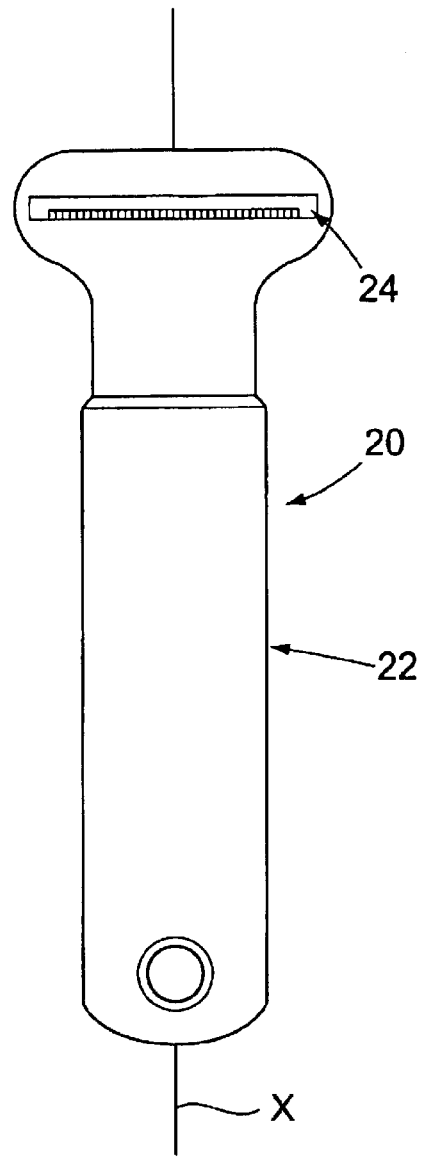
FIG. 2 is a front-elevational view of the grooming tool of FIG. 1.
Figure 3:
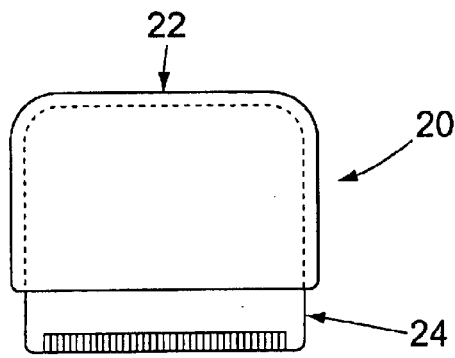
FIG. 3 is a top plan view of the grooming tool of FIG. 1.

Referring first to FIGS. 1–3 of the drawings, a pet grooming tool of the present invention is generally indicated by reference numeral 20. The pet grooming tool 20 is adapted to be used with a furry pet (not shown) such as a dog or cat having loose hair and non-loose hair for removing the loose hair from the pet. The grooming tool comprises an elongate handle portion, generally indicated at 22, and a pet engageable portion, generally indicated at 24. The elongate handle portion 22 extends generally along a handle axis X. The handle portion 22 includes a hand-grip portion 26 and a head portion 28. The hand-grip portion 26 is preferably sized and shaped to be comfortably held in the palm of a user's hand. Preferably, the hand-grip portion is at least three inches in length. The head portion 28 preferably extends axially from the hand-grip portion 26 and is adapted for securely holding the pet-engageable portion.

Figure 4:
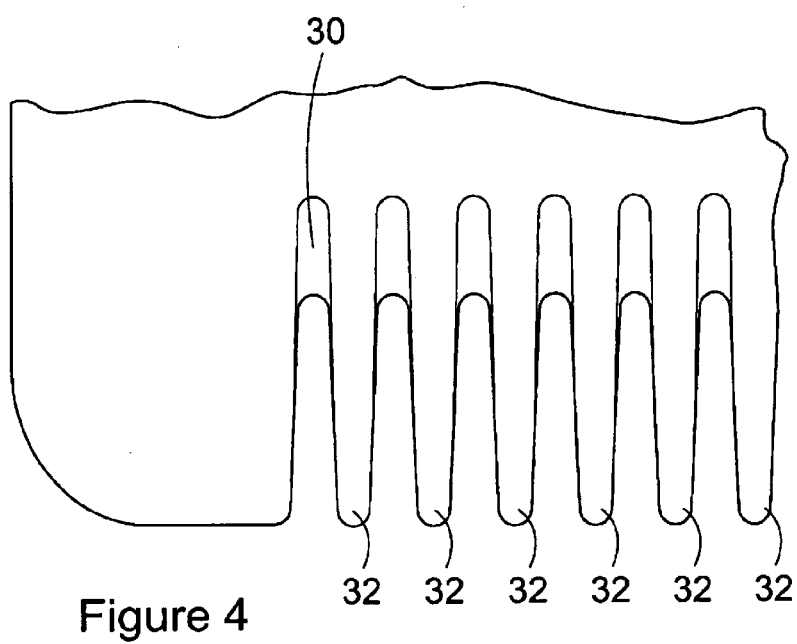
FIG. 4 is an enlarged, fragmented, top plan view showing a plurality of teeth and a blade portion of the pet-engageable portion of the grooming tool of FIG. 1.
Figure 5:
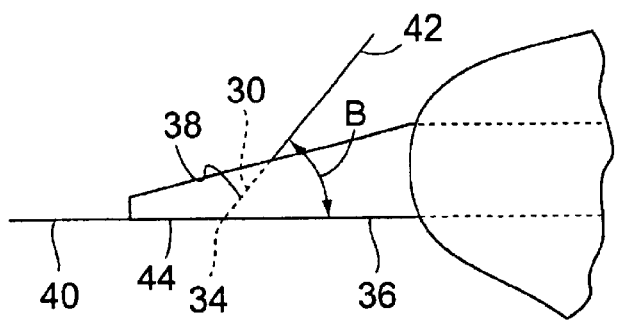
FIG. 5 is an enlarged, fragmented side-elevational view of the pet-engageable portion of the grooming tool of FIG. 1, the blade portion being shown by hidden lines.

The pet engageable portion 24 may consist of a one-piece blade for an electric animal hair clipper, such as an Oster® A5® blade (size 40 or 50, but preferably size 40) commercially available from Sunbeam Corporation. The pet engageable portion 24 includes a blade portion 30 (FIGS. 4 and 5) and a plurality of teeth 32. The blade portion includes a blade edge 34. The teeth 32 extend from the blade edge 34. The pet engageable portion 24 is oriented relative to the handle portion 22 in a manner so that pulling the handle portion generally along the handle axis X while the pet engageable portion is in engagement with the pet causes the blade portion 30 to engage the loose hair of the pet and pull it from the pet without cutting or pulling the non-loose hair from the pet.

Preferably, the blade portion 30 has a first generally planar surface 36 and a second generally planar surface 38. Preferably, the first planar surface 36 is generally perpendicular to the handle axis X and lies in a first plane 40. The second planar surface 38 lies in a second plane 42. The first and second planar surfaces 36, 38 meet to form a sharp angle (i.e., a sharp apex). The junction (angle or apex) of the two planar surfaces 36, 38 constitutes the blade edge 34. Preferably, the first and second planes 40, 42 form an angle B between approximately 30° and 50° and more preferably approximately 40°. Preferably, the blade portion 30 is oriented relative to the handle portion 22 so that the blade portion trails the handle portion as the handle portion is pulled generally along the handle axis while the pet engageable portion 24 is in engagement with the pet. In particular, the first planar surface 36 constitutes a leading surface and the second surface 38 constitutes a trailing surface. The blade portion 30 is oriented relative to the handle portion 22 in a manner so that the trailing surface 38 trails the leading surface 36 as the handle portion is pulled generally along the handle axis while the pet engageable portion 24 is in engagement with the pet. Preferably, the blade portion 30 is spaced laterally from the hand grip portion 26 of the handle portion 22. Preferably, the teeth 32 are in a side-by-side comb-like orientation and have forward surfaces 44 which extend generally along the first planar surface 40. Preferably, the tip to tip spacing between adjacent teeth 32 is between approximately 0.02" and 0.03", and more preferably approximately 0.025". Also preferably, the teeth 32 have a length of approximately 0.08" and 0.14", and more preferably approximately 0.11" in length.

The pet engageable portion 24 is fixed to the handle portion 22 in a manner so that the pet engageable portion is generally stationary relative to the handle portion when the pet grooming tool 20 is used to remove loose hair from the pet. Preferably, the pet grooming tool 20 consists essentially of only the handle portion 22 and the pet engageable portion 24. In other words, the pet grooming tool 20 is devoid of any motor mechanism and is devoid of any components adapted to be driven by an electrical power source. This is stated herein to distinguish the pet grooming tool 20 from clippers or shavers. The pet grooming tool 20 is not configured to cut hair from the pet, but rather to pull the loose hair from the pet. Thus, the only essential components of the pet grooming tool 20 are the handle portion 22 and the pet engageable portion 24.

To remove loose hair from a pet, a user places the pet engageable portion 24 of the pet grooming tool 20 in engagement with the pet. More particularly, the user places the teeth 32 of the pet grooming tool 20 against the pet's coat in a manner so that the first planar surface 36 is generally perpendicular to the region of the pet's coat engaged by the teeth 32. The user then pulls the handle portion 22 generally along the handle axis X while maintaining engagement of the teeth 32 with the pet's coat. Preferably, the user also maintains the generally perpendicular orientation of the first planar surface 36 relative to the pet's coat. The pet grooming tool 20 is pulled in a manner so that the second planar surface 38 trails the first planar surface 36. Pulling the pet grooming tool 20 in this manner causes the blade portion 30 to engage the loose hair of the pet and pull it from the pet without cutting or pulling the non-loose hair from the pet.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of removing loose hair from a furry pet such as a dog or cat having loose hair and non-loose hair, the method comprising:

providing a grooming tool having an elongate handle portion extending generally along a handle axis, and a pet engageable portion secured to the handle portion, the pet engageable portion including a blade portion and a plurality of teeth, the blade portion including a blade edge, the teeth extending from the blade edge;

placing the pet engageable portion in engagement with the pet;

pulling the handle portion generally along the handle axis while maintaining engagement of the pet engageable portion with the pet to cause the blade edge to engage the loose hair of the pet and pull it from the pet without cutting or pulling the non-loose hair from the pet.

2. A method as set forth in claim 1 wherein the step of pulling the handle portion generally along the handle axis is performed without moving any components of the tool with an electrical power source.

3. A method as set forth in claim 1 wherein the blade portion is spaced laterally from the handle portion.

4. A method as set forth in claim 3 wherein the blade portion is mounted on the handle portion in a manner so that the blade portion trails the handle portion as the handle portion is pulled generally along the handle axis while the pet engageable portion is in engagement with the pet.

5. A method as set forth in claim 4 wherein the blade portion comprises first and second generally planar surfaces which meet to form a sharp angle, the sharp angle constituting the blade edge.

6. A method as set forth in claim 5 wherein the first surface constitutes a leading surface and the second surface constitutes a trailing surface, the blade portion being mounted on the handle portion in a manner so that the trailing surface trails the leading surface as the handle portion is pulled generally along the handle axis while the pet engageable portion is in engagement with the pet.

7. A method as set forth in claim 6 wherein the blade portion is mounted on the handle portion in a manner so that the first generally planar surfaces is contained in a plane which is generally perpendicular to the handle axis of the handle portion.

8. A method as set forth in claim 1 wherein the blade edge is sharp.

9. A method as set forth in claim 1 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

10. A method as set forth in claim 1 wherein the plurality of teeth are arranged in a row comprising a plurality of pairs of adjacent teeth, the teeth of each of at least some of the pairs of adjacent teeth being spaced from one another.

11. A method as set forth in claim 1 wherein the teeth extend away from the blade edge generally in a direction perpendicular to the handle axis.

12. A method of removing loose hair from a furry pet such as a dog or cat having loose hair and non-loose hair, the method comprising:

providing a grooming tool having an elongate handle portion extending generally along a handle axis and a pet engageable portion secured to the handle portion, the pet engageable portion including a blade portion and a plurality of teeth, the blade portion including a plurality of blade edge segments, the teeth extending from the blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth;

placing the pet engageable portion in engagement with the pet;

pulling the handle portion generally along the handle axis while maintaining engagement of the pet engageable portion with the pet to cause the blade edge segments to engage the loose hair of the pet and pull it from the pet without cutting or pulling the non-loose hair from the pet.

13. A method as set forth in claim 12 wherein the step of pulling the handle portion generally along the handle axis is performed without moving any components of the tool with an electrical power source.

14. A method as set forth in claim 12 wherein the blade portion is mounted on the handle portion in a manner so that the blade portion trails the handle portion as the handle portion is pulled generally along the handle axis while the pet engageable portion is in engagement with the pet.

15. A method as set forth in claim 12 wherein the teeth extend away from the blade edge segments generally in a direction away from the handle axis.

16. A method of removing loose hair from a furry pet such as a dog or cat having loose hair and non-loose hair, the method comprising:

providing a grooming tool having an elongate handle portion extending generally along a handle axis and a pet engageable portion secured to the handle portion, the pet engageable portion including a blade portion and a plurality of teeth, the blade portion including a plurality of blade edge segments, the teeth extending from the blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth, the teeth extending away from the blade edge segments generally in a direction perpendicular to the handle axis;

placing the pet engageable portion in engagement with the pet;

pulling the handle portion generally along the handle axis while maintaining engagement of the pet engageable portion with the pet to cause the blade edge segments to engage the loose hair of the pet and pull it from the pet without cutting or pulling the non-loose hair from the pet.

\* \* \* \* \*